US012696132B2

(12) United States Patent     (10) Patent No.:    US 12,696,132 B2

Ozozlu et al.                  (45) Date of Patent:       Jul. 28, 2026

(54) SIGNAL STORM AVOIDANCE BETWEEN SATELLITES AND USER EQUIPMENT

(71) Applicant: T-MOBILE INNOVATIONS LLC, Overland Park, KS (US)

(72) Inventors: Akin Ozozlu, McLean, VA (US); Nagi A. Mansour, Arlington, VA (US); Kevin Almon Hart, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 630 days.

(21) Appl. No.: 18/131,445

(22) Filed: Apr. 6, 2023

(65) Prior Publication Data

US 2024/0340692 A1     Oct. 10, 2024

(51) Int. Cl.
| | | |
|---|---|---|
| *H04W 28/02* | (2009.01) | |
| *H04W 28/08* | (2023.01) | |
| *H04W 84/06* | (2009.01) | |

(52) U.S. Cl.
CPC ... *H04W 28/0284* (2013.01); *H04W 28/0958* (2020.05); *H04W 84/06* (2013.01)

(58) Field of Classification Search
CPC .......... H04B 7/18513; H04W 28/0284; H04W 28/0958; H04W 28/0289; H04W 84/06
See application file for complete search history.

(56) References Cited

U.S. PATENT DOCUMENTS

| | | | | |
|---|---|---|---|---|
| 10,523,684 | B2 * | 12/2019 | Cooper | H04W 16/24 |
| 10,819,420 | B2 * | 10/2020 | Roy | H04B 7/18513 |
| 11,012,361 | B2 * | 5/2021 | Ramachandran | H04L 69/163 |
| 2014/0250237 | A1 * | 9/2014 | Shama | H04L 47/36 |
| | | | | 709/232 |
| 2015/0282003 | A1 * | 10/2015 | Noerpel | H04L 47/263 |
| | | | | 370/236 |
| 2016/0037434 | A1 * | 2/2016 | Gopal | H04W 40/246 |
| | | | | 370/316 |
| 2019/0103913 | A1 * | 4/2019 | Cooper | H04B 7/18586 |
| 2019/0104132 | A1 | 4/2019 | Cooper et al. | |
| 2020/0313806 | A1 * | 10/2020 | Wang | H04L 1/1812 |
| 2022/0312301 | A1 | 9/2022 | Christopherson et al. | |
| 2023/0014795 | A1 * | 1/2023 | Khan | G06N 3/08 |
| 2024/0187504 | A1 * | 6/2024 | Kano | H04L 47/193 |

OTHER PUBLICATIONS

European Search Report received for European Application No. 24168680.7, mailed on Oct. 31, 2024, 16 pages.
Extended European Search Report and Search Opinion received for European Application No. 24168680.7, mailed on Jan. 23, 2025, 14 pages.

* cited by examiner

*Primary Examiner* — Bailor C Hsu

(74) *Attorney, Agent, or Firm* — SHOOK, HARDY & BACON L.L.P.

(57) ABSTRACT

Embodiments of the present disclosure are directed to systems and methods for avoiding or mitigating signals storms on satellite radio access networks. Based on a determination that a UE is connected to a satellite, one or more uplink mitigation measures will be carried out. The uplink mitigation measures function to limit the uplink signaling between the UE and the satellite, preserving the radio resources of the satellite in order, for example, to provide coverage for a greater number of user equipment terminals within the satellite's coverage area.

18 Claims, 3 Drawing Sheets

300

200

204

220

226

224

222

206

210

212

214

202

208

NETWORK

300

DETERMINE UE IS CONNECTED TO A SATELLITE RADIO ACCESS NETWORK ~310

DETERMINE UPLINK MODIFICATIONS ~320

IMPLEMENT UPLINK MODIFICATIONS ~330

SIGNAL STORM AVOIDANCE BETWEEN SATELLITES AND USER EQUIPMENT

SUMMARY

The present disclosure is directed to avoiding signaling storms between satellites and user equipment, substantially as shown and/or described in connection with at least one of the Figures, and as set forth more completely in the claims.

According to various aspects of the technology, a user equipment (UE) modifies signaling behavior based on a determination that the UE is utilizing a satellite to communicate with a network. Modern UEs communicate all manner of signals in the uplink to a base station or relay to which they are attached. Whether querying mail servers for new emails, checking for updates on social media feeds, fetching packets for streaming video, or any number of other activities, UEs bombard their access points. In terrestrial networks, excessive signaling is mitigated by the size of geographic service areas and a high capacity of radio resources. In contrast, a single satellite access point can provide for coverage for thousands of square miles and has a finite amount of power for handling radio resources. Excessive signaling from UEs communicating with a satellite can cause congestion and a denial of service for other devices. By limiting signaling from UEs on the basis of their connection to a satellite, signaling storms can be avoided and overall system performance can be improved.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
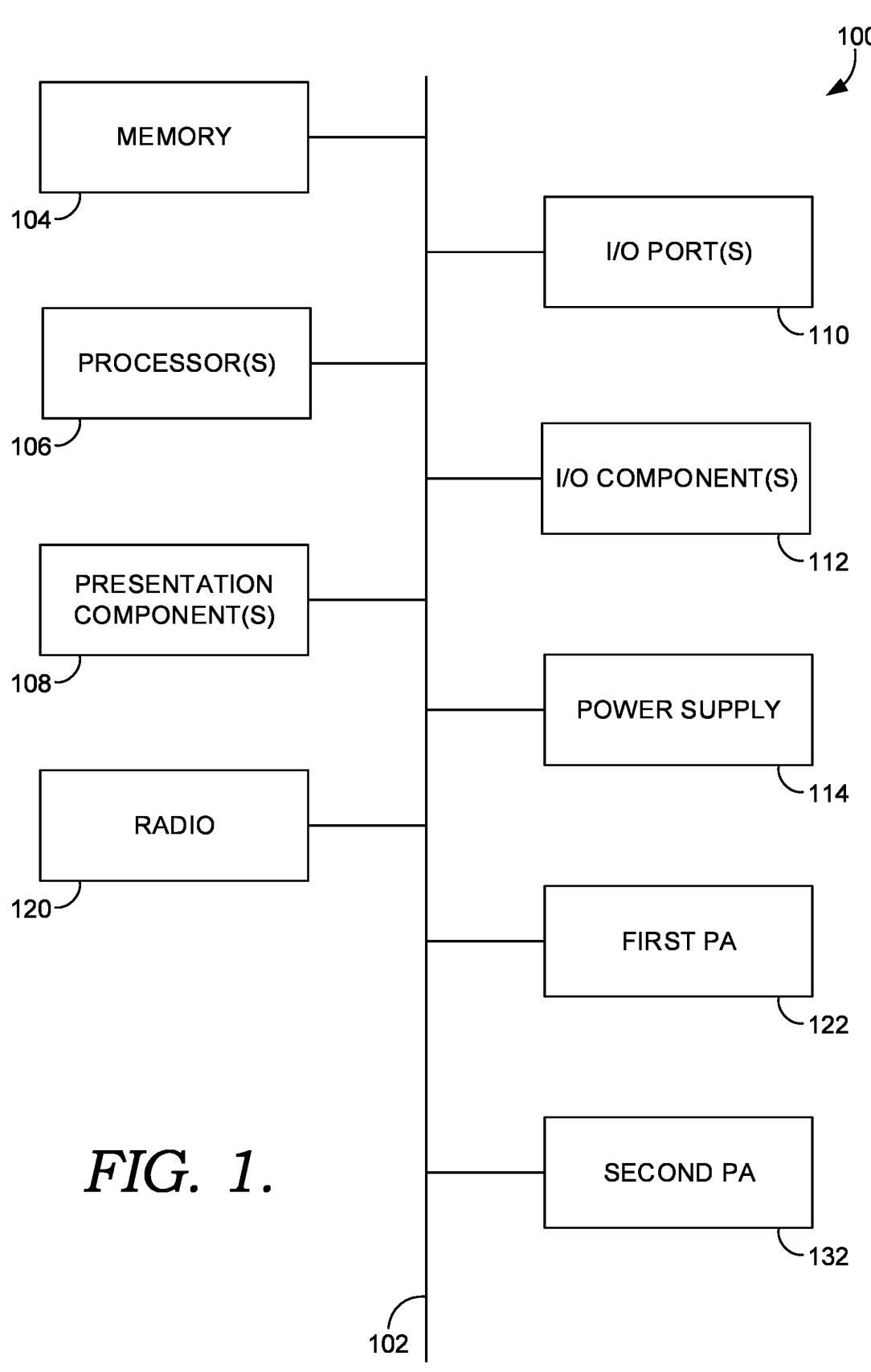
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, the provision of telecommunication services is moving beyond the surface of the earth at increasing speed. Network operators, once exclusively operating terrestrial base stations, will begin to utilize satellite communication systems to provide coverage to areas unserved by terrestrial base stations. Because a single satellite is configured to provide coverage for a very large area and because satellites have limited radio resources, satellite communication systems capable of receiving user uplink communications are susceptible to signal storms. A signal storm in telecommunications is an event in which a large number of signals are transmitted simultaneously or in rapid succession, overwhelming the network and causing disruptions in the communication. Even legitimate traffic, generated by a large number of UEs can cause a signal storm.

In order to prevent or mitigate a signal storm of a satellite, the present disclosure is directed to systems and methods for radio resource conservation on return uplinks between a UE and a satellite. Based on a determination that the UE is wirelessly connected to a satellite, a UE will be permitted to communicate certain types of uplink signaling to the satellite and not to send other types of uplink signaling. In some aspects, the UE may implement the radio resource conservation in the uplink by blocking applications on the UE from causing the transmission of impermissible types of signaling. By limiting the types of uplink signaling, a signal storm at the satellite is less likely to occur, or, is more likely to abate quickly if it has already begun.

Accordingly, a first aspect of the present disclosure is directed to a system for mitigating a signal storm on a satellite uplink. The system comprises one or more antennas configured to receive downlink signals from a satellite radio access network (RAN). The system further comprises one or more computer processing components configured to determine, based on one or more signals received from the satellite RAN by the one or more antennas, that the system is connected to a satellite. The one or more computer processing components are further configured to determine that a user link of the satellite is experiencing a congestion condition. The one or more computer processing components are further configured to implement one or more uplink mitigation procedures.

A second aspect of the present disclosure is directed to a method for communicating with a satellite radio access network (RAN). The method comprises determining, based on one or more signals received from a RAN, that a user equipment (UE) is connected to a satellite. The method further comprises determining that a set of uplink signals having a characteristic are unauthorized for transmission to the satellite in response to determining that the UE is connected to the satellite. The method further comprises blocking a transmission of uplink signals having the characteristic.

According to another aspect of the technology described herein, a method for controlling uplink communications between a user equipment (UE) and a satellite radio access network (RAN). The method comprises determining that the UE is connected to a satellite. The method further comprises, communicating an instruction to the UE to block transmission of uplink signals having a characteristic in response to determining that the UE is connected to the satellite.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
FIG. 2 illustrates a diagram of an exemplary environment in which implementations of the present disclosure may be employed.

Turning now to FIG. 2, an exemplary network environment is illustrated in which implementations of the present disclosure may be employed. Such a network environment is illustrated and designated generally as network environment 200. At a high level the network environment 200 comprises a gateway 202, a satellite 204, a UE 206, and a network 208. Though the composition of network environment 200 illustrates objects in the singular, it should be understood that more than one of each component is expressly conceived as being within the bounds of the present disclosure; for example, the network environment 200 may comprise multiple gateways, multiple distinct networks, multiple UEs, multiple satellites that communicate with a single gateway, and the like. Similarly, though the UE 206 is illustrated as a cellular phone, a UE suitable for implementations with the present disclosure may be any computing device having any one or more aspects described with respect to FIG. 1.

The network environment 200 includes a gateway 202 communicatively connected to the network 208 and the satellite 204. The gateway 202 may be connected to the network 208 via one or more wireless or wired connections and is connected to the satellite 204 via a feeder link 210. The gateway 202 may take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 may communicate with a plurality of satellites, including the satellite 204. The network 208 comprises any one or more public or private networks, any one or more of which may be configured as a satellite network, a publicly switched telephony network (PSTN), or a cellular telecommunications network. In aspects, the network 208 may comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

The network environment 200 includes one or more satellites, represented by satellite 204. The satellite 204 is generally configured to relay communications between the gateway 202 and the UE 206. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 may communicate with the UE 206 using any wireless telecommunication protocol desired by a network operator, including but not limited to 3G, 4G, 5G, 6G, 802.11x and the like. Though shown as having a single beam providing coverage to a coverage area 222, the satellite 204 may be configured to utilize a plurality of individual beams to communicate with multiple different areas at or near the same time. Similarly, though a single forward downlink 224 and a single return uplink 226 are illustrated, the UE 206 may utilize multiple downlinks and/or multiple uplinks to communicate with the satellite 204, using any one or more frequencies as desired by a satellite or network operator.

Generally, the satellite 204 is characterized by its orbit around the earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO). Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous on the basis that its orbital period is approximately equal to the length of a sidereal or solar day (approximately 24 hours); generally, a satellite in geosynchronous orbit will appear to be in the same position relative to a fixed point on the surface of the earth 208 at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth.

In view of the limited radio resources available to the satellite 204, the UE 206 may perform or instructed to perform any one more procedures for avoiding or mitigating a signal storm at the satellite 204—specifically on the return uplink 226. Generally, the one or more procedures include any one or more of determining that the UE 206 is communicatively coupled to the satellite 204, determining a type of uplink communication signaling that is permissible in view of the UE 206's connection to the satellite 204, and preventing, blocking, or modifying uplink transmissions that are not permissible. In some aspects, the prevention, blocking, or modification of uplink transmission may be based solely on a determination that the UE 206 is connected to the satellite 204; in other aspects, it may additionally be based on a determination that the satellite 204 is experiencing a threshold high level of congestion.

In order to determine if the UE 206 should limit or modify its uplink signaling, a determination is made that the UE 206 is connected to the satellite 204. In aspects, such a determination may be made by the UE 206. The UE 206 may determine that it is connected to the satellite 204 based on the UE 206 observing that one or more key performance indicators (KPIs) of the forward downlink 224 are below a predetermined threshold, such as a threshold low reference signal received power (RSRP) of one or more reference signals (e.g., channel state information signals, synchronization signals, information block signals, and the like), a threshold low signal to interference noise ratio (SINR), and a threshold poor reference signal receive quality (RSRQ). Additionally or alternatively, the UE 206 may determine that it is connected to the satellite 204 based on the UE 206 observing or obtaining a network identifier associated with the satellite 204; if the satellite 204 has a network identifier (e.g., a public land mobile network identifier (PLMN)) that is unique to a satellite-based radio access network (RAN), then the UE 206 can extract the network identifier from the system information broadcast or other control/reference signaling and identify the satellite 204 as a satellite-based RAN based on a local query of network identifiers. Additionally or alternatively, the UE 206 may determine that it is connected to the satellite 204 based on an observation that signals in the forward downlink 224 have a threshold high Doppler effect. In a first aspect, the UE 206 may determine a threshold high Doppler shift exists for signals on the forward downlink 224 based on an observation of threshold high frequency shift on said signals; in other aspects, the UE 206 may compare the observed frequency shift and account for the UE 206's own motion to determine that threshold high Doppler shift exists. For example, if the UE 206 is in motion and observes no Doppler shift of a downlink signal on the forward downlink 224, the UE 206 may determine that the originator of the signal is also in motion, and thus that the originator of the downlink signal is a satellite such as the satellite 204.

In some aspects, one or more components remote to the UE 206, such as one or more components of the network 208, may determine that the UE 206 is connected to a satellite RAN based on an indication that the UE 206 has performed cell selection/re-selection and connected to the satellite 204. Such a determination may be made, for example, during a registration procedure, in which the network 208 may determine that the UE is connected to a RAN having a network identifier associated with a satellite RAN. In aspects where the determination that the UE 206 is connected to a satellite RAN is made remote from the UE 206, an indication may be communicated to the UE 206 that it is connected to a satellite RAN as a basis for performing one or modifications to its uplink signaling. In other aspects, the determination that the UE 206 may not be separately communicated to the UE 206; instead, the UE 206 may be instructed to modify its uplink signaling.

At least partially in response to a determination that the UE 206 is connected to the satellite 204, the UE 206 may modify its uplink signaling. In aspects, the modification of uplink signaling may additionally be based upon a determination that the satellite 204 has a threshold high level of congestion or utilization; in such aspects, congestion conditions may be reported to the UE 206 or deduced by the UE 206 (e.g., based on a threshold number of uplink transmissions not receiving acknowledgement messages from the satellite 204). Generally, modifications to uplink signaling between the UE 206 and the satellite 204 on the return uplink 226 function to reduce the load on the satellite 204 by reducing the amount of signaling on the return uplink 226. The UE 206 may, based on its own action or in response to an instruction from a remote component (e.g., a component on the network 208), determine a first type of uplink signaling that may be communicated to the satellite 204 on the return uplink 226 and block/modify all other types of uplink signaling; alternatively, an unauthorized type of uplink signaling may be determined and uplink signaling of the unauthorized type may be blocked/modified. In aspects, uplink signaling may be carried out by any one or more of a reduction in background activities, service type restrictions, and packet length restrictions.

Uplink signaling may be modified by restricting the UE 206 to signaling relating to an application or service that is being actively used by the UE 206 (i.e., not in the background). In order to cause such a modification, it may be determined by the UE 206 or communicated to the UE 206 that the only type of uplink messaging that may be communicated on the return uplink 226 is for active applications/services, which can then be used by the UE 206 to block any uplink communications from background applications or services (i.e., applications or services that are not displayed or otherwise determined to be actively in use the by UE 206). In the alternative, it may be determined that background application/service uplink communications are unauthorized, which can then be used by the UE 206 to block any uplink communications from background applications/services.

Uplink signaling may be modified by restricting the UE 206 to signaling for certain types of service. Examples of service-based restrictions include affirmatively blocking certain services (e.g., data, voice), certain high bitrate protocols/codecs (e.g., Advanced Audio Coding (AAC), H.265, and the like), or certain features (e.g., all streaming audio, all steaming video, all extended reality (XR) applications, and the like); examples of service-based restrictions may alternatively come in the form of blocking all types of uplink data except for one or more authorized types (e.g., SMS, emergency voice call, standard voice call, or any other type as desired by a network operator). In order to cause such a modification, it may be determined by the UE 206 or communicated to the UE 206 that uplink signaling for one or more authorized service may be communicated to the satellite 204 on the return uplink 226 and all other types of uplink signaling should be blocked or modified; alternatively, it may be determined by the UE 206 or communicated to the UE 206 that uplink signaling for one or more services types, protocols/codecs, and/or features are unauthorized and that all such uplink signaling should be blocked from transmission or modified prior to transmission.

Uplink signaling may be modified by implementing packet length restrictions.). In order to cause such a modification, it may be determined by the UE 206 or communicated to the UE 206 that uplink messaging may only be communicated on the return uplink 226 if its packet length is less than a predetermined limit, which can then be used by the UE 206 to block any uplink communications with packet lengths that exceed the predetermined limit. In the alternative, it may be determined that payloads having a packet length greater than the predetermined limit are unauthorized, which can then be used by the UE 206 to block any uplink communications having a payload greater than the predetermined limit.

In any aspect, uplink signaling may be modified by the UE 206 instead of being blocked altogether. For example, if the UE 206 determines a certain codec is unauthorized (or is instructed that the certain codec is unauthorized), then the UE 206 may convert an uplink message from the unauthorized codec to a second codec that is either affirmatively permitted or is not unauthorized. In another example, if a packet-length restriction is in place, the UE 206 may convert an uplink message from having a first packet length that exceeds a limit to a second packet length that is less than the limit.

Figure 3:
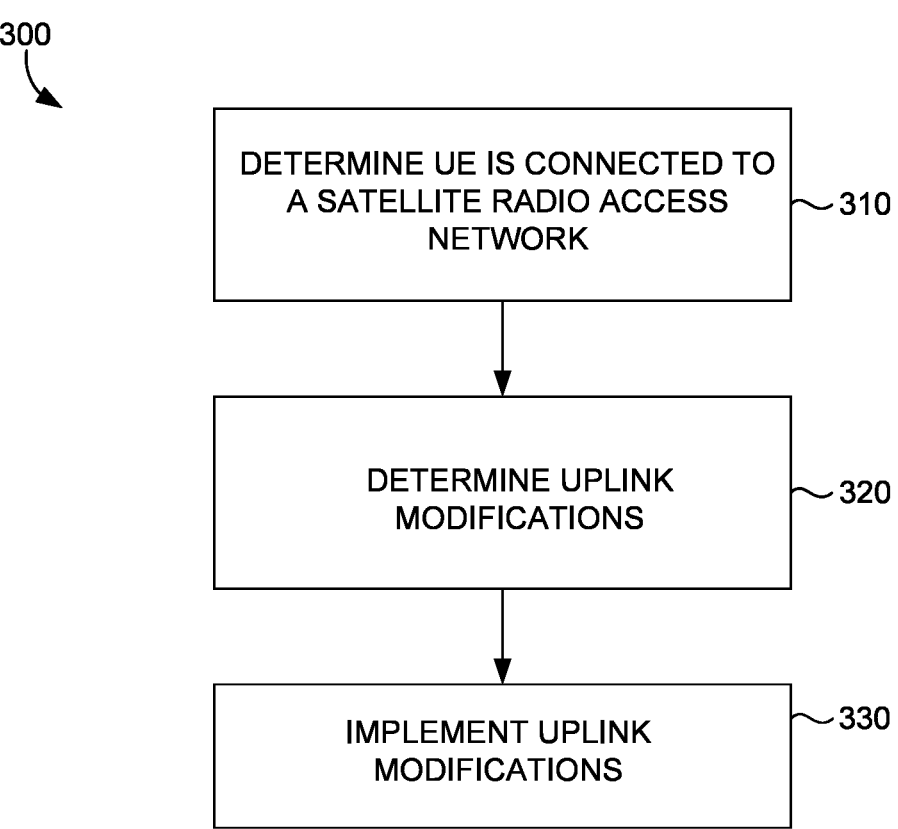
FIG. 3 depicts a flow diagram of an exemplary method for satellite signal storm avoidance, in accordance with embodiments described herein.

Turning now to FIG. 3, a flow chart representing a method 300 is provided. At a first step 310, it is determined that a UE, such as the UE 206 of FIG. 2, is connected to a satellite, such as the satellite 204 of FIG. 2, of a satellite radio access network according to any one or more aspects described with respect to FIG. 2. At a second step 320, one or more uplink modifications are determined in order to avoid or mitigate a signal storm on a satellite return uplink, according to any one or more aspects described with respect to FIG. 2. At a third step 530, the one or more uplink modifications of the second step 320 are carried out by way of blocking (or modifying) an uplink transmission by a UE, according to any one or more aspects described with respect to FIG. 2.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for mitigating a signal storm on a satellite uplink, the system comprising:
   one or more antennas configured to receive downlink signals from a satellite radio access network (RAN); and
   one or more computer processing components configured to perform operations comprising:
   determining, based on one or more signals received from the satellite RAN by the one or more antennas, that the system is connected to a satellite;
   determining that a user link of the satellite is experiencing a congestion condition; and
   implementing one or more uplink mitigation procedures, wherein determining that the user link of the satellite is experiencing the congestion condition is based on a determination that the system has not received an acknowledgement message from the satellite in response to a greater than predetermined threshold number of uplink transmissions.

2. The system of claim 1, wherein determining that the system is connected to the satellite is based on the system observing a Doppler shift of a set of forward downlink signals between the satellite and the system.

3. The system of claim 1, wherein determining that the system is connected to the satellite is based on the system observing one or more key performance indicators (KPIs) below a predetermined threshold.

4. The system of claim 3, wherein the one or more KPIs comprise a signal strength of a set of forward downlink signals between the satellite and the system.

5. The system of claim 4, wherein the one or more KPIs further comprise a signal to interference noise ratio of the set of downlink signals between the satellite and the system.

6. The system of claim 1, wherein determining that the system is connected to the satellite is based on the system determining the satellite is associate with a network identifier, and wherein the system determines the network identifier is associated with the satellite RAN.

7. The system of claim 1, wherein the one or more uplink mitigation procedures comprise blocking a transmission of signals associated with a service type.

8. The system of claim 7, wherein the one or more uplink mitigation procedures further comprise blocking a transmission of signals associated with a predetermined set of protocols or codecs.

9. The system of claim 8, wherein the one or more uplink mitigation procedures further comprise blocking a transmission of signals exceeding a predetermined packet length.

10. A method for communicating with a satellite radio access network (RAN) comprising:

determining, by a user equipment (UE) based on one or more signals received from a RAN, that the UE is connected to a satellite;

in response to determining that the UE is connected to the satellite, determining, by the UE, that a set of uplink signals having a characteristic are unauthorized for transmission to the satellite; and blocking, by the UE, a transmission of uplink signals having the characteristic, wherein determining that the UE is connected to the satellite comprises determining that a user link of the satellite is experiencing a congestion condition based on a determination that the UE has not received an acknowledgement message from the satellite in response to a greater than predetermined threshold number of uplink transmissions.

11. The method of claim 10, wherein the characteristic comprises signals associated with a predetermined set of protocols or codecs.

12. The method of claim 10, wherein the characteristic comprises signals exceeding a predetermined packet length.

13. The method of claim 10, wherein determining that the UE is connected to a satellite is based on the UE observing a Doppler shift of a set of forward downlink signals between the satellite and the UE.

14. The method of claim 13, wherein determining that the UE is connected to a satellite is additionally based on the UE observing one or more key performance indicators (KPIs) below a predetermined threshold.

15. The method of claim 10, wherein determining that the UE is connected to a satellite is based on the UE determining the RAN is associated with a network identifier, and wherein the network identifier is associated with the satellite RAN.

16. A method for controlling uplink communications between a user equipment (UE) and a satellite radio access network (RAN) comprising:

determining, by a network component, that the UE is connected to a satellite; and in response to determining that the UE is connected to the satellite, communicating, by the network component, an instruction to the UE to block transmission of uplink signals having a characteristic, wherein determining that the UE is connected to the satellite comprises determining that a user link of the satellite is experiencing a congestion condition, the congestion condition being based on the UE not having received an acknowledgement message from the satellite in response to a greater than predetermined threshold number of uplink transmissions.

17. The method of claim 16, wherein communicating the instruction is in further response to a determination that a user link of the satellite has a greater than predetermined level of congestion.

18. The method of claim 17, wherein the characteristic comprise one or more of a predetermined set of protocols or codecs, a service type, and a greater than predetermined packet length limit.

* * * * *